(12) United States Patent
Jones et al.

(10) Patent No.: US 6,490,664 B1
(45) Date of Patent: Dec. 3, 2002

(54) METHOD AND SYSTEM FOR HANDLING DESTAGE REQUESTS DURING SHUT-DOWN IN A LOG-STRUCTURED ARRAY

(75) Inventors: Michael Reese Jones, Longmont, CO (US); Juan Li, San Jose, CA (US); Dung Kim Nguyen, San Jose, CA (US); Hai-Fang Yun, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/333,143

(22) Filed: Jun. 14, 1999

(51) Int. Cl.⁷ .............................................. G06F 12/08
(52) U.S. Cl. ........................... 711/154; 710/32; 714/24; 707/200; 711/114
(58) Field of Search ................................ 711/114, 112, 711/154, 4, 162, 170, 151, 163, 166; 714/6, 24, 16, 20; 767/200, 202; 710/32, 36, 39

(56) References Cited

U.S. PATENT DOCUMENTS

| | | | |
|---|---|---|---|
| 4,562,489 A | | 12/1985 | Gaskell et al. |
| 4,636,946 A | | 1/1987 | Hartung et al. |
| 5,269,019 A | | 12/1993 | Peterson et al. |
| 5,339,446 A | * | 8/1994 | Yamasaki et al. ............ 713/340 |
| 5,416,915 A | | 5/1995 | Mattson et al. |
| 5,418,921 A | | 5/1995 | Cortney et al. |
| 5,426,758 A | | 6/1995 | Candelaria et al. .......... 395/425 |
| 5,473,761 A | | 12/1995 | Parks et al. .................. 395/404 |
| 5,488,701 A | * | 1/1996 | Brady et al. ..................... 714/6 |
| 5,537,588 A | | 7/1996 | Engelmann et al. ......... 395/600 |
| 5,550,998 A | | 8/1996 | Willis et al. ................. 395/441 |
| 5,551,003 A | | 8/1996 | Mattson et al. .............. 395/463 |
| 5,574,952 A | | 11/1996 | Brady et al. ................. 395/888 |
| 5,581,724 A | | 12/1996 | Belsan et al. |
| 5,636,360 A | * | 6/1997 | Courts et al. ................ 710/200 |
| 5,671,390 A | * | 9/1997 | Brady et al. ................. 711/113 |
| 5,802,344 A | * | 9/1998 | Menon et al. ............... 711/165 |
| 5,848,280 A | * | 12/1998 | Hanaoka ...................... 713/300 |
| 6,021,408 A | * | 2/2000 | Ledain et al. ................ 707/201 |
| 6,052,799 A | * | 4/2000 | Li et al. ......................... 714/13 |
| 6,131,148 A | * | 10/2000 | West et al. ................... 711/162 |
| 6,141,731 A | * | 10/2000 | Beardsley et al. ........... 711/133 |
| 6,260,158 B1 | * | 7/2001 | Purcell et al. .................. 714/10 |
| 6,336,164 B1 | * | 1/2002 | Gerdt et al. .................. 707/206 |
| 6,389,555 B2 | * | 5/2002 | Purcell et al. .................. 714/10 |

FOREIGN PATENT DOCUMENTS

| | | | |
|---|---|---|---|
| EP | 682306 A | 5/1995 | ............. G06F/3/06 |

OTHER PUBLICATIONS

"Detecting Command Timeouts with Small Computer System Interface Command Tag Queuing" IBM Technical Disclosure, Oct. 1992.*

King et al., Overview of Disaster Recovery for Transaction Processing, The 10th International Conference on Distributed Computing Systems, May 28, 1990, pp. 286–293.*

(List continued on next page.)

*Primary Examiner*—Matthew Kim
*Assistant Examiner*—Pierre-Michel Bataille
(74) *Attorney, Agent, or Firm*—Sawyer Law Group LLP

(57) ABSTRACT

Aspects for handling destage requests during shutdown in a log-structured array storage subsystem are described. In a method aspect, the method includes receiving a shut-down command, and utilizing at least three data structures for tracking destage requests when the shut-down command is received, wherein closing of open segments before completion of the shut-down is ensured. A further method aspect includes maintaining an outstanding requests list and destage requests list, forming a missing requests list based on the contents of the outstanding requests list and destage requests list when a shut-down command occurs, and tracking destage request processing with the outstanding requests list, destage requests list and missing requests list until all destage requests have been successfully completed.

17 Claims, 4 Drawing Sheets

OTHER PUBLICATIONS

Rosenblum et al., "The design and Implementation of Log Structured File System", ACM Transactions on Computer Systems, vol. 10. Feb. 1992, pp. 26–52.*

Devarakonda et al. "Recovery in the Calypso File System", ACM Transactions on Computer Systems, vol. 14. Aug. 1996, pp. 287–310.*

Gray et al., "The Recovery Manager of the System R Database Manager", ACM Computing Surveys, vol. 13, Jun. 1981, pp. 223–242.*

Seltzer, M., "Transaction Support in a Log–Structured File System", IEEE—Ninth International Conference on Data Engineering, pp. 503–510, 1993.*

IBM Technical Disclosure Bulletin, "Reducing Data Movement in Log Structure File System Garbage Collection", vol. 38, No. 02, Feb. 1995.

IBM Technical Disclosure Bulletin, "Piecewise Directory Mapping for Write–Once Read–Many and Log Structure File Systems", vol. 38, No. 01, Jan. 1995.

* cited by examiner

CACHE ORIENTED BUFFERED DASD ARRAY

METHOD AND SYSTEM FOR HANDLING DESTAGE REQUESTS DURING SHUT-DOWN IN A LOG-STRUCTURED ARRAY

FIELD OF THE INVENTION

The present invention relates to log structured arrays for storage subsystems, and more particularly to handling of destage requests during shutdown in a log-structured array.

BACKGROUND OF THE INVENTION

In storage subsystem, a redundant array of inexpensive disks, RAID, is one solution to I/O (input/output) bottleneck problems. RAID typically increases disk bandwidth through parallelism for accessing data and provides high data availability through redundancy. One problem associated with some levels of RAID is the write penalty; a write operation actually requires two disk reads (of old data and parity) and two disk writes (of updated data and the newly calculated parity). Log Structured Array, (LSA), writes all customer data to disk sequentially in a log-like structure, and enables RAID to support data compression. The amount of compression achieved is dependent on the actual data values. After a piece of data is modified, it may not compress to the same number of bytes and thus will not fit into the space originally allocated to it. This problem is encountered in any storage system that assigns a piece of data to a disk fixed location; LSA avoids this problem, since updated data is written to end of the log structure.

Through LSA, a logical track, LT, which is the typical unit accessed by I/O programs, is allowed to be updated to a different location on disk. Since the physical address of a logical track changes over time, a directory, called LSA directory, is necessary to keep track of the current LT's physical address on the array. Each directory entry also records the logical track's current length, as this may vary with compression.

The log structured array consists of N+P+S physical disk drives, where N is the number of HDDs' (hard disk drives) worth of physical space available for customer data, P is the number of HDDs' worth of physical space for parity data, and S is the number of HDDs' worth of physical space for spare drives. Each HDD is divided into large consecutive areas called segment columns. Typically, a segment column is as large as a logical cylinder. Corresponding segment columns from the N+P+S HDDs constitute a segment. The array has as many segments as there are segment columns on a HDD disk in the array. An example of the layout for such a system is shown in FIG. 1. In a RAID-5 configuration, one of the segment columns of a segment contains the parity of the remaining data segment columns of the segment.

Referring to FIG. 1, the storage for the partition 52 is arranged as segments 56, where each segment has N data segment columns 58 and one parity segment column 59. The logical tracks 60 are stored within segment columns. A segment directory 62 contains information on each of the logical tracks in the segment which is used during garbage collection and recovery procedures. The segment directory 62 is stored in a small number of sectors out of a segment's total disk space. As shown, the entire segment directory resides in one same segment column in each of the segments. Alternatively, the segment directory can be spread among the devices. In a RAID-5 system, parity is distributed among the devices as shown.

A segment column is defined as an arbitrary number of contiguous physical tracks as described above. Typically it is desirable to define a segment column to be the same size as a logical cylinder. The collection of disk recording areas comprising corresponding segment columns from each of the HDDs forms what is called a segment.

LSA segments are categorized as one of the following types: free, which refers to a segment that contains no valid data; open, which refers to a segment that is available to hold LTs being destaged; closed, which refers to a segment containing some valid data, but to which no destaged data can be further assigned; and being garbage collected, GC, which refers to a closed segment that is currently being garbage collected, as discussed hereinbelow. A closed segment consists of 'live' LTs and 'holes'. The former are LTs that were assigned to the segment during the segment's open phase and still reside in the segment. The latter is space vacated by LTs that were assigned to the segment but have subsequently been updated and assigned to different open segments. A closed segment's occupancy is the sum of the lengths of the segment's live tracks.

A destage operation provides for the LTs in a logical cylinder to be destaged together from a cache within the storage subsystem to a storage device to enhance the seek affinity of sequential accesses. A logical cylinder is typically called a neighborhood, and a group of logical tracks in a logical cylinder destaged together is called a neighborhood in destage (NID) or neighborhood destage request. Destaging a neighborhood essentially involves the following steps:

1. The neighborhood in destage is assigned to an open segment.
2. An open segment remains available to accept other neighborhoods in destage until it is deemed full enough to close in accordance with a desired algorithm.
3. The data and parity of the segment is written to disk before the segment is considered closed.
4. Each LT in the open segment has an entry in the segment directory that describe the LT's location in the segment. The segment directory is written on disk, as part of the segment.

An LT in a closed segment may be updated and destaged again, at which time it is assigned to another open segment. This causes the previous copy of the LT to become obsolete, thus forming a 'hole' in the closed segment. Garbage collection (GC) is the process of reclaiming 'holes' in closed segments. GC is started when the number of free segments falls below a certain threshold.

The process of garbage collecting a segment involves reading the segment's directory from disk, then scanning each segment directory entry and comparing the LT's address as indicated by the segment directory entry with the address as indicated by the LSA directory entry. If the two entries match, then the LT still resides in the segment and is considered 'live'. All the live LTs are then read from disk into memory and sorted by neighborhood. These neighborhoods in destage then proceed to be destaged in the same manner as described above. These NIDs are assigned to open segments; when such open segments close successfully, the NIDs are garbage collected, thus decreasing the occupancy of the segments in which the NIDs previously resided. When a segment's occupancy declines to zero, either as a result of garbage collection or as a result of movement of tracks from normal destage activity, the segment becomes free.

In a multi-nodal data storage system, a data storage controller has multiple nodes; each of the nodes may comprise, for example, an Intel model 1960 microprocessor. The multi-processing nodes are interconnected in a torus ring topology. A lower interface (LI) node executes microcode that manages the disk arrays including an LSA partition. The LSA subcomponent of the LI manages the LSA: A cache node manages the cache memory. The LI node and cache node can be the same physical entity, where microcode running at the same node performs the different functions.

A pair of LI nodes can provide shared management. Referring to FIG. 2 a first node may operate a series of storage devices 1 through N+1, while a second would operate storage devices N+2 through 2N+2. In the case that the first node fails the second node can take over the failed node and vice versa. The storage devices may be reassigned from one node to another to balance the nodes workload as well. Alternatively, each node is assigned exclusive control over a selected group of storage devices.

The processing activity on a node may shut down for a variety of reasons, such as the turning off of the power switch, loss of AC power to the subsystem, a disruptive EC activation, battery failure, quiescing the subsystem prior to taking a node off-line or adding a new node, removal of a node for servicing or performing diagnostic tests. An LSA subcomponent may receive a shut-down notification while it is performing any of its normal tasks, e.g. garbage collecting segments, assigning NIDs to locations in the array, writing data or parity on the devices, checkpointing the LSA directories, staging tracks, etc. As part of the fundamental operation of a log-structured system, data from several destage requests from the cache component are buffered by the LSA subcomponent; LTs are not written to the array immediately upon assignment to an open segment. When enough data has accumulated, the data is then stored on the device with a single disk write operation. At the time of a shutdown notification, there may be outstanding destage requests, which must be safely stored on disk before the shutdown procedure completes. One aspect that is problematic during shutdown is hardening all NIDs (i.e., writing both data and parity on disk) that have been issued by a cache component prior to the shutdown notification.

The task of hardening destage requests generally involves assigning all outstanding NIDs to open segments, then closing all those segments. The difficulty lies in determining when all outstanding destage requests have been received. While the cache component may have finished issuing all its requests at the time the command to shut-down is received, the requests from the cache component are not guaranteed to arrive in any order, nor are they guaranteed to arrive before the shut-down notification because of the asynchronous nature of inter-component communication. Such problems may be overcome if it can be determined when all such requests have been received, since it can then be determined when all outstanding requests have been assigned to open segments, for subsequently closing all open segments.

Installation of a timer that is set to expire in a fixed amount of time after receipt of the shut-down notification is one potential method. With the use of a timer, all its open segments are closed in order to harden all outstanding NIDs when the time expires. To ensure against expiration of the timer before the arrival of all requests when the network traffic is heavy, the timer value must be set to a relatively large number. Unfortunately, use of a timer with a sufficiently large timer value is problematic in some cases, such as loss of AC power, when time constraints are placed on the shut-down of the subsystem.

Accordingly, a need exists for a method and system of hardening destage requests in an LSA before shutdown of the processor. The present invention addresses such a need.

SUMMARY OF THE INVENTION

The present invention provides aspects for handling destage requests during shutdown in a log-structured array storage subsystem. In a method aspect, the method includes receiving a shut-down command, and utilizing at least three data structures for tracking destage requests when the shut-down command is received, wherein closing of open segments before completion of the shut-down is ensured. A further method aspect includes maintaining an outstanding requests list and destage requests list, forming a missing requests list based on the contents of the outstanding requests list and destage requests list when a shut-down command occurs, and tracking destage request processing with the outstanding requests list, destage requests list and missing requests list until all destage requests have been successfully completed.

Through the present invention, data structures are efficiently utilized during shutdown to handle destage requests and ensure proper hardening of the destage requests. The present invention further achieves handling of failed destage requests with minimization of the time needed to complete shut-down and avoidance of the possible wasting of free disk space. These and other advantages of the aspects of the present invention will be more fully understood in conjunction with the following detailed description and accompanying drawings.

DETAILED DESCRIPTION OF THE INVENTION

The present invention relates to ensuring proper handling of destage requests during shutdown in an LSA. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
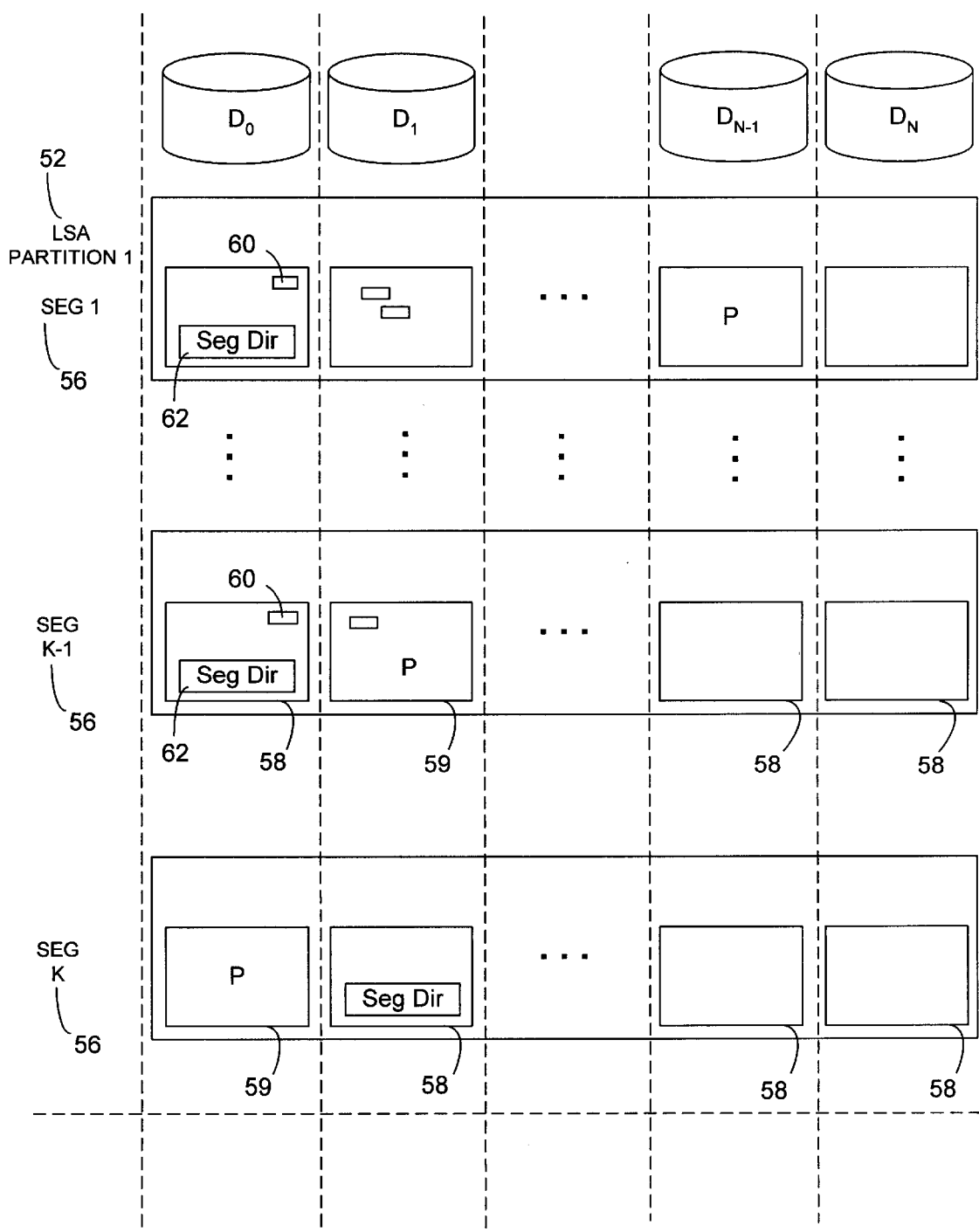
FIG. 1 illustrates an example of an LSA layout.
Figure 2:
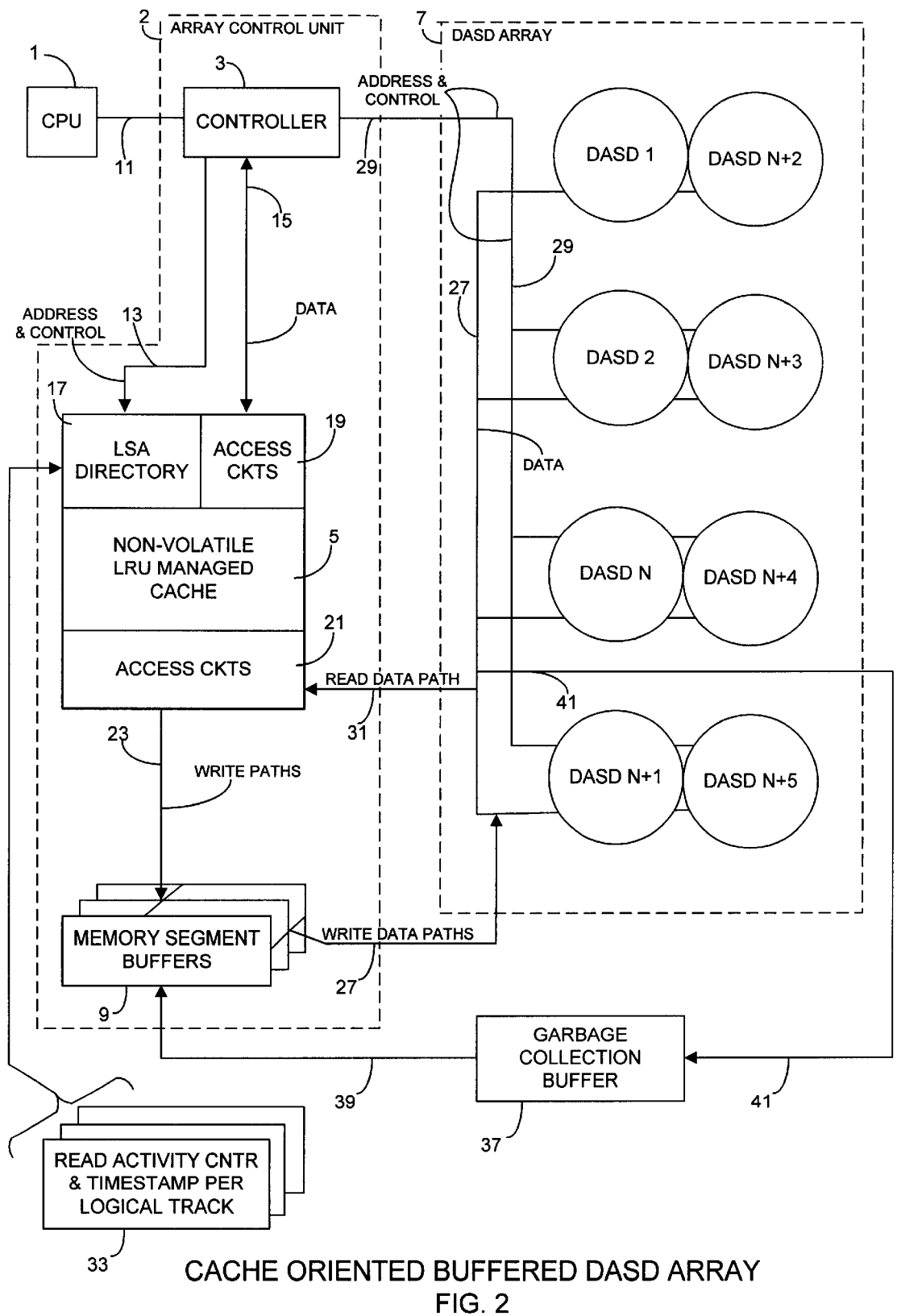
FIG. 2 illustrates a cache oriented buffered DASD array system in accordance with the present invention.

Referring now to FIG. 2, there is shown a system including a host processor 1, and an external store. The external store is formed from an array 7 of 2 groups of N+1 DASDs, and an array control unit 2 coupling the processor 1 to the array 7. Processor 1 preferably comprises at least one or more processors used to execute application and system code; memory to hold application code, system code, and data; and means responsive to read and write calls from executing applications for accessing information not otherwise in memory from the external store through the system code (otherwise termed an operating system such as MVS, AIX, CICS, etc.)

Typically, as described in Luiz et al., U.S. Pat. No. 4,207,609, "Method and Means for Path Independent Device Reservation and Reconnection in a Multi-CPU and Shared Device Access System", issued Jun. 10, 1980, there is shown an architecture for establishing an access path to data by which a processor host or CPU obtains variable or fixed length records from an attached DASD storage subsystem.

Under this architecture, the CPU creates a dedicated virtual processor for accessing and transferring data streams over demand/response interfaces to attached subsystems using chains of special purpose I/O instructions termed "channel command words" or CCWs. The CCWs are stored in a portion of CPU main memory in support of fast calls. When an application program executes a read or write requiring access to external storage (usually attached DASD storage), then, for example, the CPU S/370 MVS operating system initiates such a reference with a START I/O command. This command causes the CPU to suspend its multiprocessing state, transfer to the CCW chain, and re-establish its prior state after CCW chain completion.

Referring again to FIG. 2, processor 1 sends an appropriate CCW chain to controller 3 over path 11. Controller 3 'interprets' each of the CCW's and responsively applies counterpart control and address signals over path 13 to LSA directory 17 to ascertain location of data. Data is transferred between host processor 1 and array 7 in the read direction over a path including read data path 31, access circuits 21, cache 5, access circuits 19, path 15, and controller 3. Data is transferred in the write direction over a path including controller 3, access circuits 19, cache 5, access circuits 21, accumulating memory segment buffer 9 and write path 27.

Controller 3 comprises one or more microprocessors with sufficient associated local memory for storing software for interpreting the CCWs and managing the cache 5 and the DASD array 7 according to the LSA storage model of this invention, including managing control of hardening of destage requests during shut-down. DASD array 7 may be managed by controller 3 as a RAID 3 or RAID 5 array, as is well understood by those skilled in the art.

Array control unit 2 includes a large, non-volatile (NV) cache memory 5 and memory segment buffers 9 formed from a plurality of segment sized buffers. The NV cache 5 holds both updated logical tracks received from the host CPU 1 and clean logical tracks read from DASD array 7. Cache 5 is managed in the traditional LRU fashion. That is, cache 5 contains clean LTs organized in one LRU list and modified (dirty) LTs organized in another LRU list. The fraction of cache occupied by modified LTs is monitored by the controller 3. When this fraction exceeds some threshold, some number of modified LTs are assigned to one of the memory segment buffers 9, which are subsequently written into contiguous sectors on the devices in the DASD array 7. When cache memory is needed to hold new logical tracks read from DASD, or new logical tracks received from the host system, LRU clean tracks can be overwritten in cache 5.

The buffering aspect of cache 5 permits delay in writing modified logical tracks to one of the memory segment buffers 9 and then to the DASD array 7. This delay can be advantageously employed to minimize any loss of seek affinity. If other writes to adjacent LTs are received into the cache 5 from the system (controller 3) before the first track is selected for pushing out from cache 5 to one of the memory segment buffers 9, then all logically adjacent modified LTs can be pushed out at the same time into the same memory segment column of the memory segment buffer. Thus, if adjacent LTs are modified within some window of time proportional to the size of cache 5, they will likely still be placed contiguously on DASD, and no seek affinity will be lost.

The cache 5 is operated according to the following constraints:

(1) When the fraction of cache space occupied by modified tracks exceeds a threshold a modified LRU LT and logically adjacent LTs are pushed from the cache 5 to one of the memory segment buffers 9, preferably to a single memory segment-column. That is, if there are at least c (e.g., c=2) adjacent clean LTs in cache 5 at this time, then the adjacent clean LTs should likewise be pushed out to the memory buffer of the same segment as well.

(2) Shortly before the space containing an LRU clean LT is scheduled for reuse, ascertain whether at least m (e.g., m=1) logically adjacent clean LTs are in cache 5 and are not currently stored physically contiguously on DASD disk. If such LTs are found, push the LRU clean LT and all adjacent clean and modified LTs to one of the memory segment buffers 9, preferably in the same memory segment-column.

The term "logically adjacent tracks" refers to tracks which reside in the same "neighborhood". For this purpose, a "neighborhood" is defined as an ordered set of logical tracks. It follows that "adjacent neighborhoods" are those in which the first k logical tracks are in neighborhood 1, the second k tracks are in neighborhood 2, and so on. Then, a track is logically adjacent to another if they are both in the same neighborhood. Thus, for example, a neighborhood consisting of k=15 logical tracks can form a logical cylinder on a typical logical DASD storage device.

The present invention utilizes microcode in the form of an agent, cache controller, and LSA subcomponent manager as control mechanisms within controller 3 of array control unit 2. An outstanding requests list, ORL, is a data structure managed by the agent during normal operation as follows. A cache controller submits any neighborhood destage request to the agent. The agent determines the appropriate node, i.e., LSA subcomponent, to which to direct the request, adds the request to the list of outstanding requests for that subcomponent, then forwards the request to the destination node. When a NID completes, the LSA subcomponent notifies the appropriate agent of the completion of the request. The agent then removes the request from the appropriate outstanding requests list (ORL) and notifies the cache controller.

Figure 3:
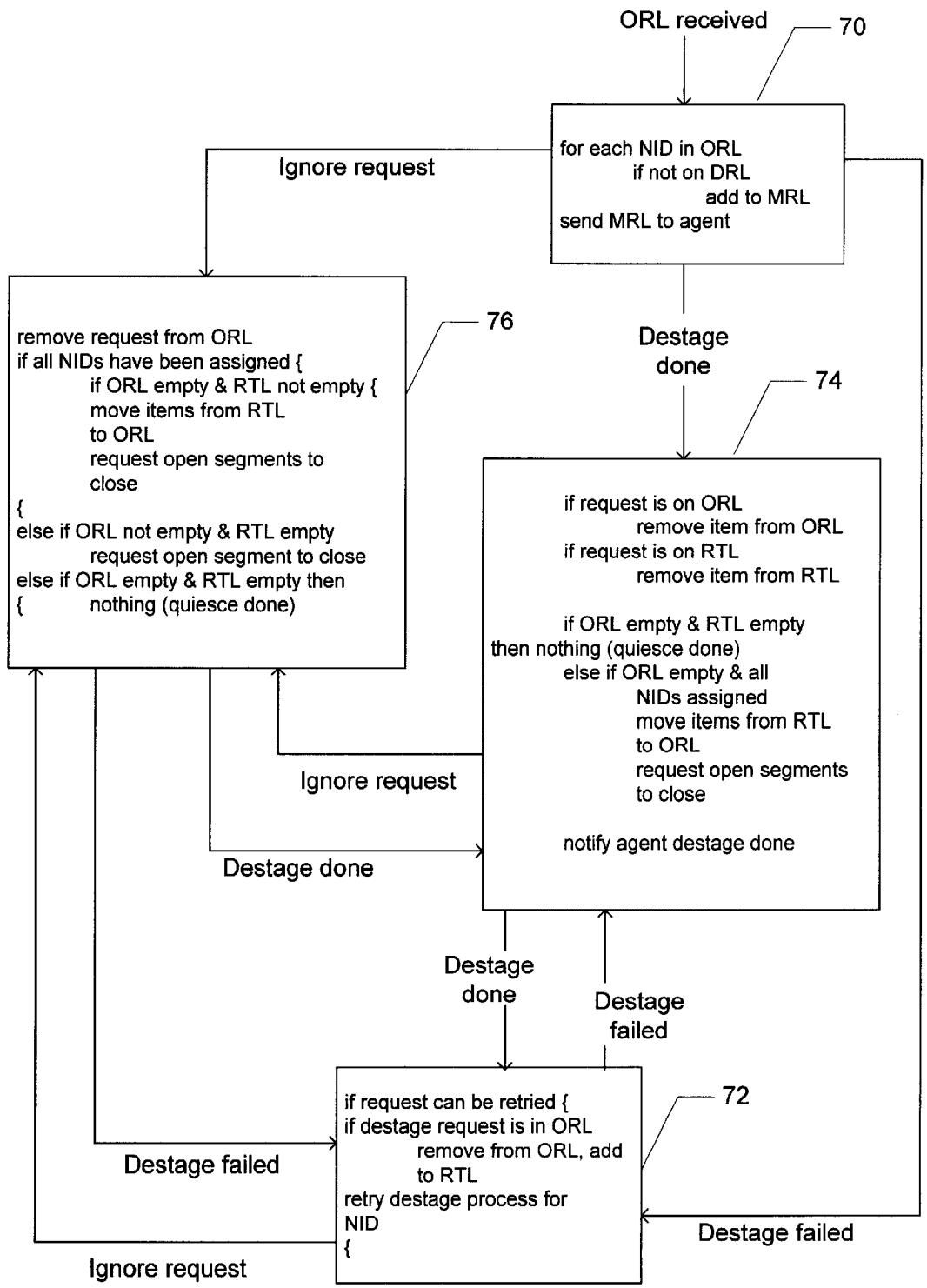
FIGS. 3 and 4 illustrate state diagrams in accordance with the present invention.
Figure 4:
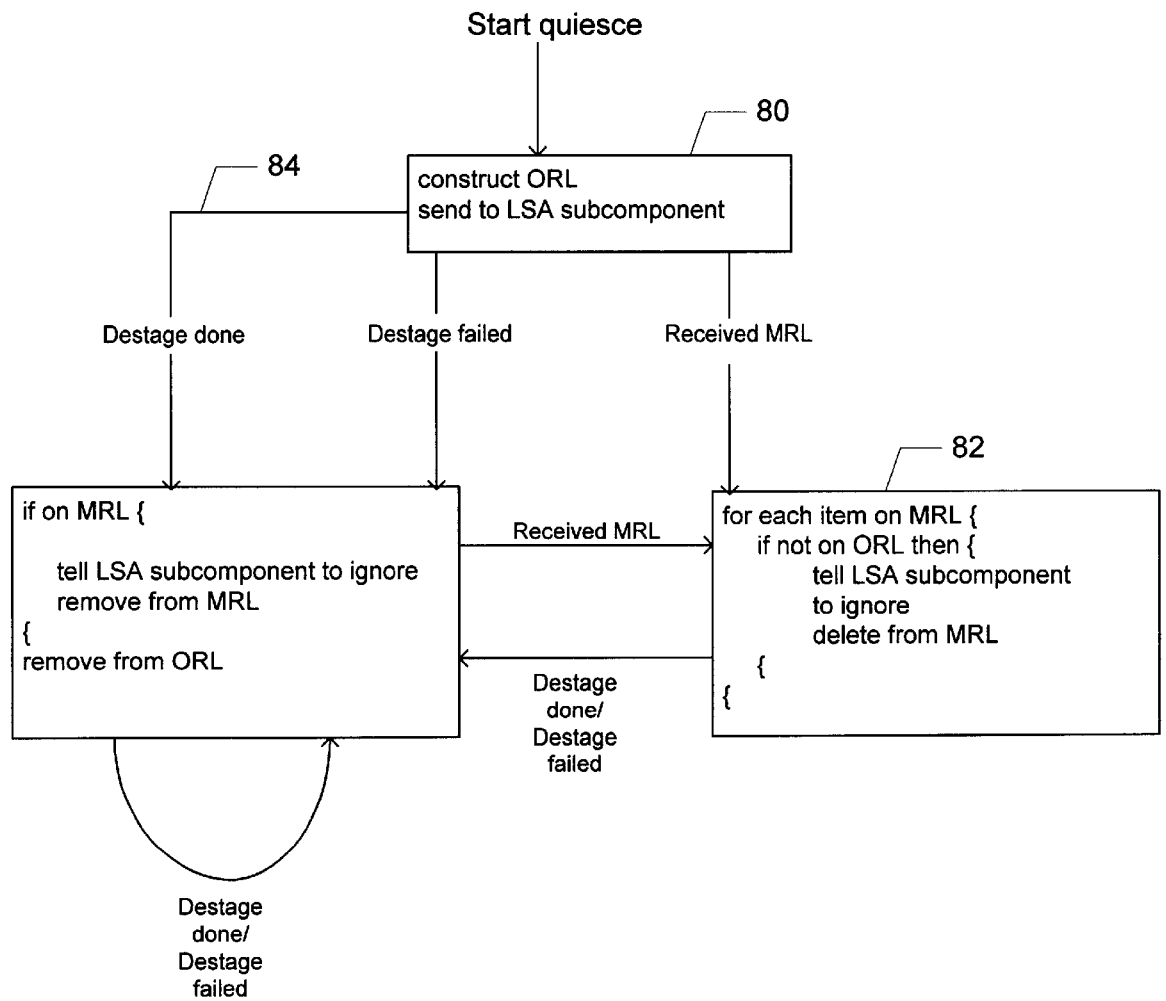

When a shut-down command is issued, a process for ensuring hardening of destage requests in accordance with the present invention occurs as described with reference to the state diagrams of FIGS. 3 and 4. FIG. 3 represents a state diagram for the LSA subcomponent, while FIG. 4 illustrates a state diagram for the agent. Once the shutdown command is issued, the LSA subcomponent receives a copy of the ORL for that subcomponent from the agent (state 70, FIG. 3, state 80, FIG. 4). The subcomponent compares the ORL with another data structure it has comprising a destage requests list, DRL, which specifies those requests that the LSA subcomponent has received and is currently processing. In accordance with the comparison results, the LSA subcomponent creates a missing requests list (MRL) data structure, which indicates all the requests that appear in the ORL, but not in the DRL. The LSA subcomponent continues by sending the MRL to the appropriate agent. Items that appear in the MRL either have been issued by the cache controller, but have not been received by the LSA subcomponent, or have completed the destage operation, but the indication of the completion has not yet reached the agent at the time the agent sends the LSA subcomponent its ORL.

After the above exchange that occurs at the beginning of the shut-down process, each LSA subcomponent maintains a copy of an ORL for each agent with which it communicates, and each agent maintains a copy of an MRL for each LSA subcomponent with which it communicates. In contrast, during normal operation, each LSA subcomponent maintains only a DRL, and each LSA agent maintains only an ORL.

When an agent receives a copy of an MRL, the agent enters state 82 and checks each item against the ORL. If an item does not appear in the ORL, then the agent received the request's completion notification and deleted the request from the ORL during the interim of the ORL's creation and the receipt of the corresponding MRL by the agent. In such case, the agent deletes the item from its copy of the MRL and instructs the LSA subcomponent to delete the item from its own copy of the ORL. The LSA subcomponent then deletes the items from its own ORL (state 76, FIG. 3). If the item does appear in the ORL, the agent keeps the item on its copy of the MRL. Each time an agent subsequently receives notification of a completed destage request, the agent enters state 84 and removes the item from its ORL, then checks whether that request is listed in the MRL. If listed, the agent deletes the item from its copy of the MRL and instructs the LSA subcomponent to delete the item from the subcomponent's copy of the ORL.

Of course, if the subcomponent has already performed the deletion, the instruction to delete in the subcomponent can be ignored. For example, during shutdown mode, when an LSA subcomponent receives a NID request from an agent, the subcomponent marks the request on the appropriate ORL as received. The destage request is then handled in same manner as during normal operating mode; that is, the logical tracks are assigned to an open segment, the data is XORed to the parity segment column, the data is written on disk, etc. When this destage request completes and returns to the appropriate agent, the agent may find that the request appears on its MRL, because the request was not received by the LSA subcomponent at the time it created the MRL. As described above, the agent notifies the subcomponent to delete the request from the subcomponent's ORL. In this case the subcomponent, having already performed this task with completion of the destage request, can ignore the information.

Eventually all items that appeared on the ORLs originally received by the LSA subcomponent will either have been deleted, as described previously, or have been marked as received. When all remaining destage requests on the ORLs have been assigned to some open segment, the LSA subcomponent issues a special command to close all open segments.

As the open segments finish the closing process, destage requests complete. The subcomponent removes each completed destage request from its DRL and ORL, before forwarding the information to the appropriate agent. When an LSA subcomponent's ORLs and DRL are empty, the shutdown procedure is complete with respect to the handling of NIDs issued by the cache controller. Of course, garbage collection and checkpointing processes must also be handled during shut-down mode, as discussed in U.S. Pat. No. 6,052,799 assigned to the assignee of the present invention, but these processes are not addressed here.

A variety of device-related failures may prevent one or more segment columns in an open segment from writing its data. If only one segment column fails to write its data, the data in the segment is still protected by parity. In this case, the segment closes in the normal manner, as if all disk write operations had been successful. If multiple segment columns encounter failures, however, the open segment cannot close successfully, and all NIDs whose logical tracks have been placed in the segment complete with a failed status. In the case of some classes of failures, failed destage requests do not return to the agent and cache controller with an error status, as they ordinarily would during non-shut down mode; instead, those NIDs automatically resubmit themselves to be assigned to another open segment.

The presence of such error conditions during shutdown mode complicates the solution described above. If a destage request fails after the LSA subcomponent issues the command to close all open segments, a new segment must be opened to hold the retried request. The problem that arises is similar to that of determining when all destage requests have been received from the cache controller, so that all open segments may be closed. In this case, the problem is to determine when all outstanding destage requests have been notified of their completion status and have either returned that status to their agents or submitted themselves for reassignment. If the LSA subcomponent has knowledge of all requests which must be retried, it can issue a single command to close all open segments when all such requests have been reassigned. Without that information, the LSA subcomponent must guess at the appropriate interval to issue a 'close all open segments' command such as by guessing a timeout period.

In order to make sure that all the destage requests that need to reassigned are accounted for, the timer value can be either set to a large value so only one 'close all open segments' command is given, or set to smaller value, requiring 'close all open segment' to occur multiple times. Either case is suboptimal. The larger timer value may not be feasible under time constraints. Further, issuing 'close all open segments' multiple times may cause poor disk packing efficiency because the command forces all open segments, even ones with very few assigned NIDs, to close, and if more requests arrive after the command is issued, new free segments must be opened, then forced again to be closed prematurely. Therefore, more segments open than necessary, and those segments close with more free space.

In accordance with the present invention, a retry list (RTL) is utilized instead, which keeps track of all destage requests that have failed and are resubmitted for retry.

If a request fails but can be retried, the subcomponent removes the request from the appropriate ORL, but restores the request in the DRL. The request is then added to a data structure for a retry list, RTL, (state 72, FIG. 3). Each time a NID is removed from the ORL in either 76 or 74, a check is performed for the conditions that the ORL is empty and all NIDS have been assigned. If these conditions hold and if the RTL is not empty, then the LSA subcomponent moves all items from the RTL to the ORLs (state 76 and state 74, FIG. 3). The LSA subcomponent then requests that all open segments be closed. The emptying of the RTL before the closing of all open segments prepares for possibly another round of destage request failures and retries. These steps are repeated until the RTL and the ORLs are empty.

Through the present invention, four data structures have been introduced to handle the coordination of the buffering of NIDs and the asynchronous mode of communication between the cache controller and the LSA subcomponent to ensure that all outstanding destage requests complete as part of the LSA shut-down process. In summary, each LSA agent owns an ORL per LSA subcomponent; an ORL records outstanding NIDs issued by the cache controller on which the agent resides and routed to the appropriate LSA subcomponent. Each LSA subcomponent owns a DRL, which keeps track of the outstanding destage requests that it is processing. As part of its shut-down procedure, each LSA subcomponent creates an MRL for each agent to record the discrepancies between which destage requests the subcomponent has outstanding and which requests the agents think the subcomponent has outstanding. If open segments do not close successfully during shutdown time, the LSA subcomponent creates an RTL to account for the destage requests that are reassigned to new open segments. The use of these data structures ensures that all open segments are closed before completion of shut-down and minimizes the number of times that an LSA subcomponents issues the 'close all open segments' command, which in turn reduces the time needed to complete shut-down and avoids possible waste of free disk space.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for handling destage requests during shut-down in a log-structured array storage subsystem, the method comprising:

receiving a shut-down command; and utilizing at least three data structures for tracking destage requests when the shut-down command is received, including utilizing an outstanding requests list and a destage requests list by comparing the outstanding requests list to the destage requests list, and forming a missing requests list based on the comparison, wherein the missing requests list further comprises a list of discrepancies between the outstanding requests list and the destage requests list, and further wherein hardening of all LTs (logical tracks) in destage requests issued before completion of the shut-down is ensured.

2. The method of claim 1 wherein the outstanding requests list further comprises a record of outstanding destage requests issued by a cache controller mechanism.

3. The method of claim 1 wherein the destage requests list further comprises a list of destage requests being processed by a log-structured array manager mechanism.

4. A method for handling destage requests during shut-down in a log-structured array storage subsystem, the method comprising:

receiving a shut-down command;

utilizing at least three data structures for tracking destage requests when the shut-down command is received, including utilizing an outstanding requests list and a destage requests list by comparing the outstanding requests list to the destage requests list, and forming a missing requests list based on the comparison; and forming a retry list for destage requests reassigned to new open segments when open segments do not close successfully during shut-down, wherein hardening of all LTs (logical tracks) in destage requests issued before completion of the shut-down is ensured.

5. The method of claim 4 further comprising moving destage requests from the retry list to the outstanding requests list (ORL) when the ORL is empty and all destage requests have been assigned to open segments.

6. The method of claim 5 wherein array control unit request all open segments to initiate the closing process.

7. The method of claim 5 further comprising processing destage requests until the outstanding requests list and retry list are empty.

8. The method of claim 7 further comprising removing a destage request from the destage request list when the destage request completes.

9. The method of claim 7 further comprising removing a destage request from the ORL when the destage request completes.

10. A method for handling destage requests during shut-down in a log-structured array storage subsystem, the method comprising:

maintaining an outstanding requests list and a destage requests list;

forming a missing requests list based on the contents of the outstanding requests list and destage requests list when a shut-down command occurs;

tracking destage request processing with the outstanding requests list, destage requests list and missing requests list until all destage requests have been successfully completed;

determining whether a destage request has failed, removing the destage request that has failed from the outstanding requests list, and adding the destage request to a retry list; and determining when the outstanding requests list is empty, and moving the destage request from the retry list to the outstanding requests list when the outstanding request list becomes empty and when the retry list is not empty and when all destage requests have been assigned to open segments.

11. The method of claim 10 further comprising requesting all open segments to initiate a closing process.

12. A method for handling destage requests during shut-down in a log-structure array storage subsystem, the method comprising:

maintaining an outstanding request list and a destage requests list by maintaining a record of outstanding neighborhoods in destage issued by a cache controller, and maintaining a list of destage operations being issued by a cache controller, and maintaining a list of destage operations being processed by a log-structured array manager;

forming a missing request list based on the contents of the outstanding requests list and destage request list when a shut-down command occurs; and tracking destage request processing with the outstanding requests list, destage requests lists and missing request list until all destage requests have been successfully completed.

13. A system for handling destage requests during shut-down in a log-structured array storage subsystem, the system comprising:

a processor;

an array control unit coupled to the processor, the array control unit including a cache and a controller for maintaining an outstanding requests list and destage requests list, forming a missing requests list based on the contents of the outstanding requests list and destage requests list when a shut-down command occurs, tracking destage request processing with the outstanding requests list, destage requests list and missing requests list until all destage requests have been successfully completed, determining whether a destage request has failed, removing the destage request that has failed from the outstanding requests list, adding the destage request to a retry list, determining when the outstanding requests list is empty, and moving destage requests from the retry list to the outstanding requests list when the retry list is not empty and all destage requests have been assigned to open segments; and a storage subsystem coupled to the array control unit for storing data from the cache.

14. The system of claim 13 wherein the array control unit further requests all open segments to initiate a closing process.

15. The system of claim 13 wherein the array control unit further maintains the outstanding requests list as a record of outstanding neighborhoods in destage issued by a cache controller of the array control unit.

16. A system for handling destage requests during shut-down in a log-structured array storage subsystem, the system comprising:

a processor;

an array control unit coupled to the processor, the array control unit including a cache and a controller for maintaining an outstanding requests list and destage requests list, forming a missing requests list based on the contents of the outstanding requests list and destage requests list when a shut-down command occurs, and tracking destage request processing with the outstanding requests list, destage requests list and missing requests list until all destage requests have been successfully completed, wherein the array control unit further maintains the destage requests list as a list of destage operations being processed by a log-structured array manager mechanism of the array control unit and wherein the log-structured array manager removes a destage request from the destage request list when the destage request completes; and a storage subsystem coupled to the array control unit for storing data from the cache.

17. A system for handling destage requests during shut-down in a log-structured array storage subsystem, the system comprising:

a processor;

an array control unit coupled to the processor, the array control unit including a cache and a controller for maintaining an outstanding requests list and destage requests list, forming a missing requests list based on the contents of the outstanding requests list and destage requests list when a shut-down command occurs, and tracking destage request processing with the outstanding requests list, destage requests list and missing requests list until all destage requests have been successfully completed, wherein the array control unit further maintains the destage requests list as a list of destage operations being processed by a log-structured array manager mechanism of the array control unit and wherein the log-structured array manager removes a destage request from an outstanding request list when the destage request completes; and a storage subsystem coupled to the array control unit for storing data from the cache.

* * * * *